United States Patent
Kim et al.

(10) Patent No.: US 9,454,172 B2
(45) Date of Patent: Sep. 27, 2016

(54) VOLTAGE CONTROL CIRCUIT WITH TEMPERATURE COMPENSATION FUNCTION

(71) Applicant: SAMSUNG ELECTRO-MECHANICS CO., LTD., Suwon, Gyunggi-do (KR)

(72) Inventors: Ki Hong Kim, Gyunggi-do (KR); Min Jin Kim, Gyunggi-do (KR); Byoung Woo Ryu, Gyunggi-do (KR); Heung Gyoon Choi, Gyunggi-do (KR)

(73) Assignee: SOLUM CO., LTD., Suwon-Si (KR)

( * ) Notice: Subject to any disclaimer, the term of this patent is extended or adjusted under 35 U.S.C. 154(b) by 0 days.

(21) Appl. No.: 14/103,722

(22) Filed: Dec. 11, 2013

(65) Prior Publication Data

US 2014/0176111 A1 Jun. 26, 2014

(30) Foreign Application Priority Data

Dec. 21, 2012 (KR) .................. 10-2012-0151458

(51) Int. Cl.
*G05F 1/613* (2006.01)
*H05B 33/08* (2006.01)

(52) U.S. Cl.
CPC ........... *G05F 1/613* (2013.01); *H05B 33/0812* (2013.01); *H05B 33/0854* (2013.01); *Y02B 20/343* (2013.01)

(58) Field of Classification Search
CPC ................ G05F 1/613; G05F 1/463
USPC ................ 323/312–317, 223–226, 273–275; 327/538–543
See application file for complete search history.

(56) References Cited

U.S. PATENT DOCUMENTS

| | | | | |
|---|---|---|---|---|
| 4,412,347 | A | * 10/1983 | Lipcon | H04L 12/2697 323/281 |
| 4,562,400 | A | * 12/1985 | Narasimhan | 323/281 |
| 7,675,272 | B2 | * 3/2010 | Michallick et al. | 323/266 |
| 8,085,006 | B2 | * 12/2011 | Burger-Riccio | G05F 1/613 323/223 |
| 2010/0315157 | A1 | * 12/2010 | Na et al. | 327/539 |
| 2011/0279105 | A1 | * 11/2011 | Hirose | 323/311 |
| 2011/0293970 | A1 | 12/2011 | Shimura et al. | |
| 2012/0075895 | A1 | * 3/2012 | Kletti | G05F 3/18 363/126 |

(Continued)

FOREIGN PATENT DOCUMENTS

| | | |
|---|---|---|
| JP | 05-40008 U | 5/1993 |
| JP | 06-045956 A | 2/1994 |

(Continued)

OTHER PUBLICATIONS

Office Action issued in Korean Patent Application No. 10-2012-0151458, dated Dec. 18, 2013.

(Continued)

*Primary Examiner* — Gary L Laxton
*Assistant Examiner* — Kyle J Moody
(74) *Attorney, Agent, or Firm* — McDermott Will & Emery LLP

(57) ABSTRACT

There is provided a voltage control circuit that is applicable to a LED device, a power supply or the like. The voltage control circuit includes: a voltage dividing unit dividing a supply voltage into a first voltage and a second voltage different from each other; a shunt regulator adjusting the first voltage according to the second voltage; and an output circuit unit outputting the voltage regulated by the shunt regulator.

4 Claims, 4 Drawing Sheets

(56) References Cited

U.S. PATENT DOCUMENTS

| | | | |
|---|---|---|---|
| 2012/0187847 A1* | 7/2012 | Hamamoto et al. | 315/125 |
| 2013/0187619 A1* | 7/2013 | Dunipace | H02M 3/156 323/225 |
| 2013/0307506 A1* | 11/2013 | Oh | G05F 1/10 323/282 |
| 2014/0145645 A1* | 5/2014 | Yao | H05B 33/0809 315/307 |
| 2014/0184103 A1* | 7/2014 | Kim | H05B 33/0851 315/307 |
| 2015/0170596 A1* | 6/2015 | Choi | G09G 3/3696 345/212 |

FOREIGN PATENT DOCUMENTS

| | | |
|---|---|---|
| JP | 2011-250628 A | 12/2011 |
| JP | 2012-052986 A | 3/2012 |
| KR | 10-2012-0098703 A | 9/2012 |
| WO | 2011/049662 A1 | 4/2011 |

OTHER PUBLICATIONS

Notice of Office Action Korean Patent Application No. 10-2012-0151458 dated Jun. 10, 2014 with English translation.

* cited by examiner

VOLTAGE CONTROL CIRCUIT WITH TEMPERATURE COMPENSATION FUNCTION

CROSS-REFERENCE TO RELATED APPLICATION

This application claims the benefit of Korean Patent Application No. 10-2012-0151458 filed on Dec. 21, 2012, with the Korean Intellectual Property Office, the disclosure of which is incorporated herein by reference.

BACKGROUND

The present disclosure relates to a voltage control circuit that may be applied to a LED device or a power supply.

Generally, in a LED device or a power supply, a detection voltage and a reference voltage are used in order to provide a desired driving voltage.

Although it is desired that such a detection voltage and a reference voltage are not affected by a change in temperature, devices used to detect the detection voltage and devices used to generate the reference voltage have characteristics that vary, depending on a change in temperature.

In order to provide a voltage that is constant regardless of a change in temperature, typical voltage control circuits employ a temperature compensating device such as a thermistor and a semiconductor switch such as a transistor.

By using such typical voltage control circuits, the reference voltage for current feedback may be varied.

In such typical voltage control circuits, however, the threshold voltage of the transistor used as the semiconductor switch may be varied according to a change in temperature and thus the comparison function of the transistor may be deteriorated. Therefore, it is difficult to precisely control the voltage if temperature changes.

Patent Document 1 referenced below relates to a temperature compensation circuit in a modulator, but does not disclose any technical feature to overcome the problem that the voltage control function deteriorates due to temperature characteristics of a transistor.

RELATED ART DOCUMENT (Patent Document 1) Japanese Patent Laid-Open Publication No. 1994-045965

SUMMARY

An aspect of the present disclosure may provide a voltage control circuit with a temperature compensation function allowing for greater precision in voltage controlling, and thus, the problem in which a voltage control function deteriorates due to temperature characteristics of a transistor may be overcome.

According to an aspect of the present disclosure, a voltage control circuit may include: a voltage dividing unit dividing a supply voltage into a first voltage and a second voltage different from each other; a shunt regulator adjusting the first voltage according to the second voltage; and an output circuit unit outputting the voltage regulated by the shunt regulator.

The voltage dividing unit may include first to third resistors connected in series between a supply voltage terminal and a ground, outputs the first voltage from a first connection node between the first resistor and the second resistor, and outputs the second voltage from a second connection node between the second resistor and the third resistor, wherein the second resistor is a NTC thermistor having an impedance characteristic inversely proportional to temperature.

The shunt regulator may include: a comparator connected to the second connection node to compare the second voltage with a threshold voltage and providing a comparison voltage; and a transistor connected between the second connection node and the ground and adjusting the second voltage according to the comparison voltage.

The output circuit unit may include a resistor and a capacitor connected in series between the supply voltage terminal and the ground, wherein a connection node between the resistor and the capacitor is connected to the first connection node and an output terminal.

The voltage control circuit may further include a voltage adjusting unit adjusting an output voltage from the output terminal according to a dimming voltage to provide a reference voltage.

The voltage adjusting unit may include: first to fifth output resistors connected in series between the supply voltage terminal and the ground; and a zener diode connected between the ground and a connection node between the second output resistor and the third output resistor, wherein the voltage adjusting unit receives the dimming voltage in the connection node between the second output resistor and the third output resistor and provides the reference voltage to a connection node between the third output resistor and the fourth output resistor.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
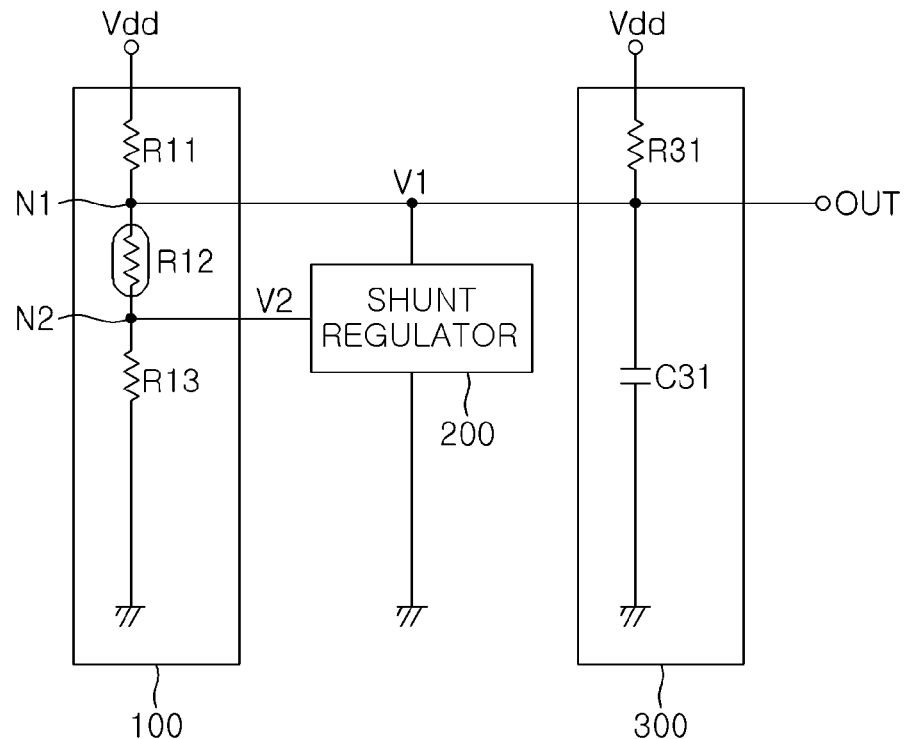
FIG. 1 is a block diagram of a voltage control circuit according to an exemplary embodiment of the present disclosure.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. Throughout the drawings, the same or like reference numerals will be used to designate the same or like elements.

FIG. 1 is a block diagram of a voltage control circuit according to an exemplary embodiment of the present disclosure.

Referring to FIG. 1, the voltage control circuit according to the exemplary embodiment of the present disclosure may include a voltage dividing unit 100, a shunt regulator 200, and an output circuit unit 300.

The voltage dividing unit 100 may divide a predetermined supply voltage $V_{dd}$ into a first voltage V1 and a second voltage V2 different from each other.

As an exemplary implementation, the voltage dividing unit 100 may include a first resistor R11, a second resistor R12, and a third resistor R13 connected in series between the supply voltage $V_{DD}$ terminal and a ground. Here, the second resistor R12 may be a NTC thermistor having impedance inversely proportional to temperature.

In this case, a first voltage V1 may be output at a first connection node N1 between the first resistor R11 and the second resistor R12, and a second voltage V2 may be output at a second connection node N2 between the second resistor R12 and the third resistor R13.

For example, if the supply voltage $V_{dd}$ is 12 V, the first voltage V1 and the second voltage V2 may be 5V and 2.5V, respectively.

The shunt regulator 200 may adjust the first voltage V1 according to the second voltage V2. Here, the shunt regulator 200 may be a TL431 IC, which has an inner threshold voltage that does not substantially vary with temperature, so that it exhibits significantly lower variation errors than the turn on voltage of an existing transistor. For example, the TL431 IC has an inner threshold voltage that ranges between 2.4825V (min) and 2.5075V (max), typically 2.495V, and has an variation error of about ±13 mV.

For example, if the second voltage V2 is lower than a threshold voltage set in the shunt regulator 200, the first voltage V1 is provided to an output terminal as it is, and if the second voltage V2 is higher than the threshold voltage set in the shunt regulator 200, the first voltage V1 may be adjusted to a lower voltage.

The output circuit unit 300 may output the voltage regulated by the shunt regulator 200.

For example, the output circuit unit 300 may stabilize the voltage regulated by the shunt regulator 200 to output it.

Figure 2:
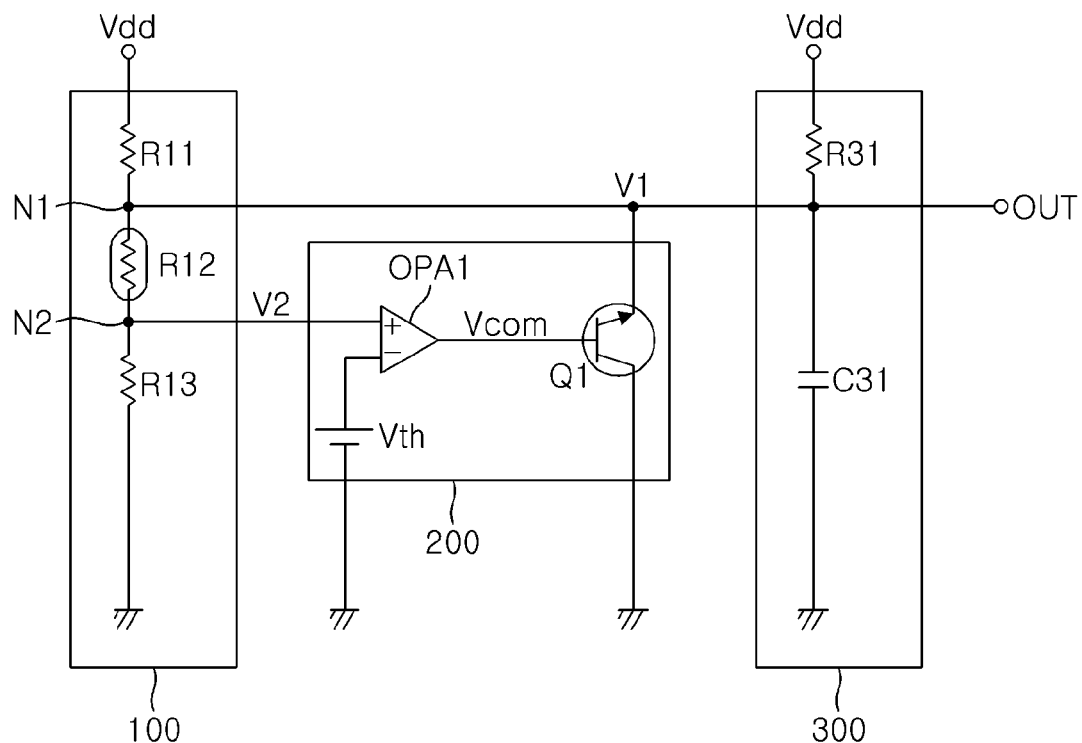
FIG. 2 is a block diagram illustrating the shunt regulator according to the exemplary embodiment of the present disclosure in detail.

FIG. 2 is a block diagram illustrating the shunt regulator according to the exemplary embodiment of the present disclosure in detail.

Referring to FIG. 2, the shunt regulator 200 may include a comparator OPA1 and a transistor Q1.

The comparator OPA1 may be connected to the second connection node N2 and may compare the second voltage V2 with a threshold voltage $V_{th}$ to provide a comparison voltage $V_{com}$.

The transistor Q1 may be connected between the second connection node N2 and the ground and may adjust the second voltage V2 according to the comparison voltage $V_{com}$.

Referring to FIGS. 1 and 2, for example, the output circuit unit 300 may include a resistor R31 and a capacitor C31 connected in series between the supply voltage $V_{dd}$ terminal and the ground.

The voltage provided through the shunt regulator 200 is charged by the capacitor C31 to be stabilized, and the stabilized voltage is output through an output terminal OUT.

Figure 3:
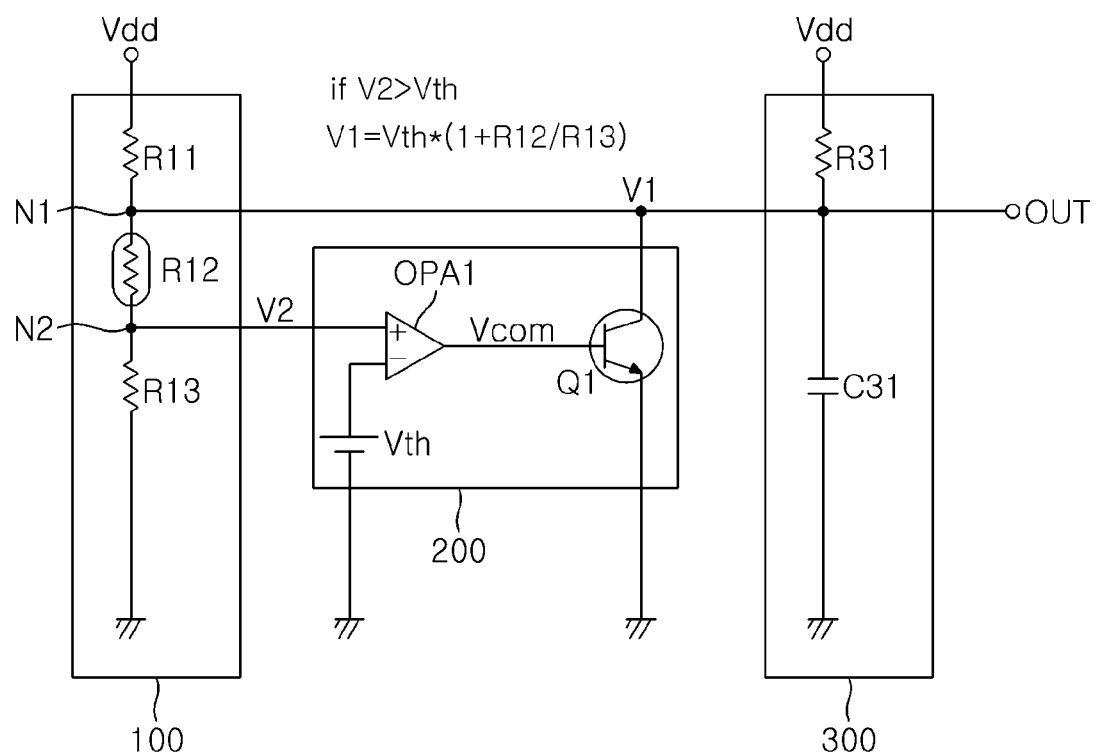
FIG. 3 is an equivalent circuit diagram of a voltage control circuit according to the exemplary embodiment of the present disclosure.
Figure 4:
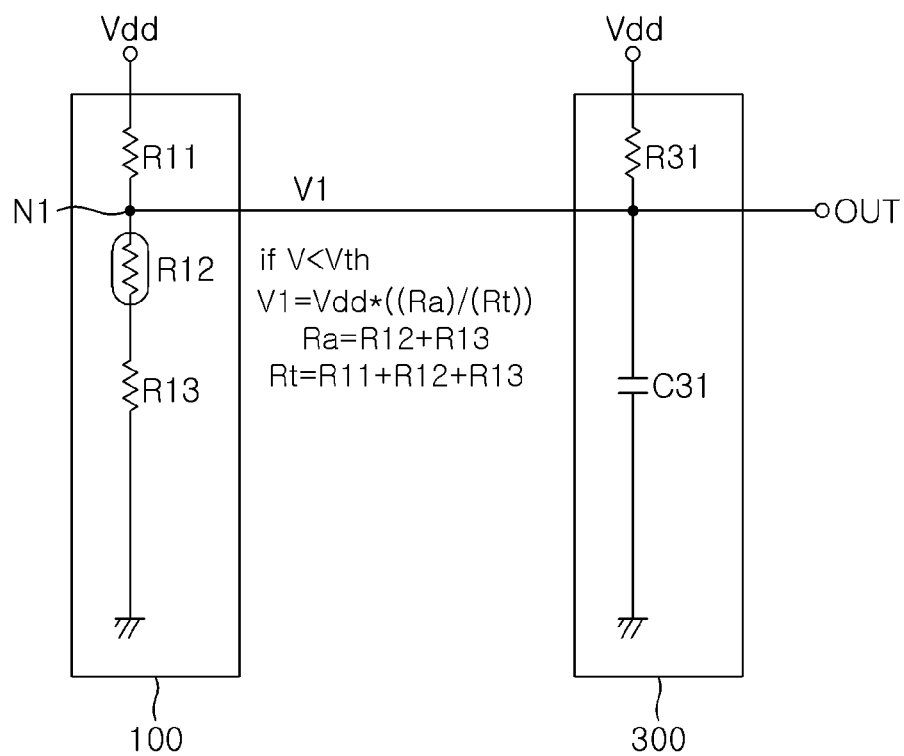
FIG. 4 is another equivalent circuit diagram of a voltage control circuit according to the exemplary embodiment of the present disclosure.

Equivalent circuits of the voltage control circuit according to the exemplary embodiment of the present disclosure may be represented as shown in FIGS. 3 and 4 depending on the operation of the shunt regulator 200.

For example, the comparator OPA1 may output the comparison voltage $V_{com}$ of a high level if the second voltage V2 is equal to or higher than the threshold voltage $V_{th}$. For example, the ambient temperature becomes higher and accordingly, the resistance value of the second resistor R12 becomes lower, and then the second voltage V2 across the third resistor R13 may be increased. As an example for the case, the threshold voltage $V_{th}$ may be 2.5V and the second voltage V2 may be 2.6V.

The transistor Q1 may be turned on when the comparison voltage $V_{com}$ has a high level. In this case, the voltage control circuit according to the exemplary embodiment of the present disclosure may be represented by the equivalent circuit shown in FIG. 3.

In contrast, the comparator OPA1 may output the comparison voltage $V_{com}$ of a low level if the second voltage V2 is lower than the threshold voltage $V_{th}$. As an example for the case, the threshold voltage $V_{th}$ may be 2.5V and the second voltage V2 may be 2.4V. The transistor Q1 may be turned off when the comparison voltage $V_{com}$ has a low level. In this case, the voltage control circuit according to the exemplary embodiment of the present disclosure may be represented by the equivalent circuit shown in FIG. 4.

FIG. 3 is a first equivalent circuit diagram of the voltage control circuit according to the exemplary embodiment of the present disclosure, and FIG. 4 is a second equivalent circuit diagram of the voltage control circuit according to the exemplary embodiment of the present disclosure.

At first, referring to FIG. 3, since the transistor Q1 is turned on, the first voltage V1 at the first connection node N1 may be determined by the shunt regulator 200 according to Equation 1.

$$V1 = Vth * \left(1 + \frac{R12}{R13}\right) \quad \text{[Equation 1]}$$

For example, assuming that the supply voltage $V_{dd}$ is 12V, the resistance of the second resistor R12, which is a NTC thermistor, is 430 KΩ at 25° C., the first and third resistors R11 and R13 are 75Ω and 51Ω, respectively, and the threshold voltage $V_{th}$ is changed from 1.7V to 2.5V, the first voltage V1 is initially 11.5V (=1.70792079*(1+430/75)).

Then, if the resistance of the second resistor R12 is gradually decreased as temperature becomes higher, the first voltage V1 has the values shown in Table 1.

TABLE 1

| R11 | R12 (NTC) | R13 | $V_{th}$ | V1 |
|---|---|---|---|---|
| 51Ω | 430Ω | 75Ω | 1.70792079 V | 11.5 V |
| 51Ω | 300Ω | 75Ω | 2.3 V | 11.5 |
| 51Ω | 200Ω | 75Ω | 2.5 V | 9.17 V |
| 51Ω | 120Ω | 75Ω | 2.5 V | 6.5 V |
| 51Ω | 75Ω | 75Ω | 2.5 V | 5.0 V |
| 51Ω | 30Ω | 75Ω | 2.5 V | 3.5 V |
| 51Ω | 10Ω | 75Ω | 2.5 V | 2.83 V |
| 51Ω | 1Ω | 75Ω | 2.5 V | 2.53 |
| 51Ω | 0Ω | 75Ω | 2.5 V | 2.5 V |

Referring to Table 1, the first voltage V1 is gradually decreased, so does an output current.

Referring to FIG. 4, since the transistor Q1 is turned off, the first voltage V1 at the first connection node N1 may be determined by the ratio of the resistance between the sum of resistance values of the second resistor R12 and the third resistor R13 and the first resistance R11 according to Equation 2.

$$V1 = Vdd * \left(\frac{Ra}{R11 + R12 + R13}\right) \quad \text{[Equation 2]}$$

$$Ra = R12 + R12$$

$$Rt = R11 + R12 + R13$$

Then, if the resistance of the second resistor R12 is gradually decreased as temperature becomes higher, the first voltage V1 has the values shown in Table 2.

TABLE 2

| R11 | R12 (NTC) | R13 | Ra (= R12 + R13) | Rt (= R11 + R12 + R13) | V1 |
|---|---|---|---|---|---|
| 51Ω | 430Ω | 75Ω | 505 | 556 | 10.89 V |
| 51Ω | 300Ω | 75Ω | 375 | 426 | 11.5 |
| 51Ω | 200Ω | 75Ω | 275 | 326 | 9.17 V |
| 51Ω | 120Ω | 75Ω | 195 | 246 | 6.5 V |
| 51Ω | 75Ω | 75Ω | 150 | 201 | 5.0 V |
| 51Ω | 30Ω | 75Ω | 105 | 156 | 3.5 V |
| 51Ω | 10Ω | 75Ω | 85 | 136 | 2.83 V |
| 51Ω | 1Ω | 75Ω | 76 | 127 | 2.53 |
| 51Ω | 0Ω | 75Ω | 75 | 126 | 2.5 V |

Referring to Table 2, the first voltage V1 is gradually decreased, so does an output current.

According to the foregoing description, the voltage control circuit according to the exemplary embodiment may decrease the first voltage V1 if the second voltage V2 corresponding to temperature change is equal to or higher than the reference voltage Vref of the shunt regulator 200 to thereby decrease the current by the first voltage V1.

Further, the voltage control circuit according to the present disclosure may further include a voltage adjusting unit 400. The voltage adjusting unit 400 may adjust the output voltage $V_{out}$ from the output terminal OUT according to a dimming voltage $V_{dim}$ to provide a reference voltage Vref.

Figure 5:
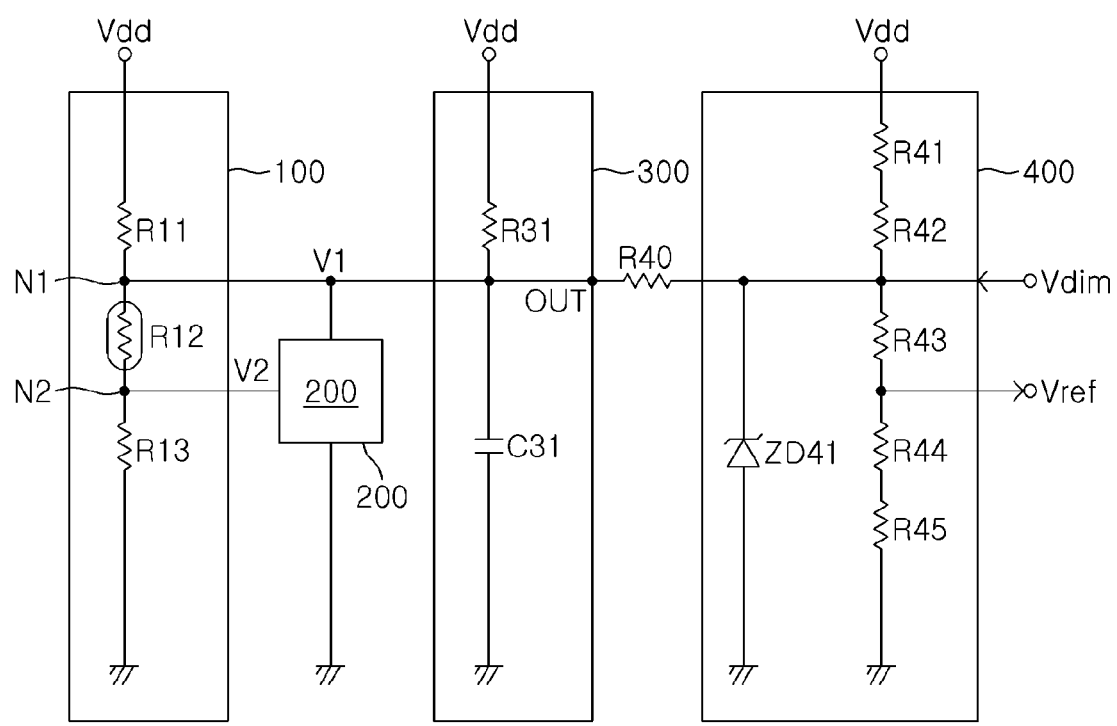
FIG. 5 is a block diagram of a variant of the voltage control circuit according to the exemplary embodiment of the present disclosure.

FIG. 5 is a block diagram of a variant of the voltage control circuit according to the exemplary embodiment of the present disclosure. Referring to FIG. 5, the voltage adjusting unit 400 may include first to fifth output resisters R41 to R45 connected in series between the supply voltage $V_{dd}$ terminal and the ground, and a zener diode ZD41 connected between the connection node, which is between the second output resistor R42 and the third output resistor R43, and the ground.

Here, at the connection node between the second output resistor R42 and the third output resistor R43, the dimming voltage $V_{dim}$ may be received, and at the connection node between the third output resistor R43 and the fourth output resistor R44, the reference voltage Vref may be provided.

When the dimming voltage $V_{dim}$ is adjusted, the voltage at the connection node between the second output resistor R42 and the third output resistor R43 at which the dimming voltage $V_{dim}$ is received in the ground is forcibly varied, and the reference voltage at Vref provided at the connection node between the third output resistor R43 and the fourth output resistor R44 may be varied.

The zener diode ZD41 is operated if the output voltage $V_{out}$ of the output terminal OUT is abnormally increased beyond a predetermined voltage or a very high voltage is applied from the outside, so that it may prevent the output voltage Vout becomes overvoltage and may protect internal circuits.

As set forth above, according to exemplary embodiments of the present disclosure, the problem that the voltage control function deteriorates due to temperature characteristics of a transistor is overcome, so that a voltage can be controlled more precisely while the temperature compensation function is still performed.

While exemplary embodiments have been shown and described above, it will be apparent to those skilled in the art that modifications and variations could be made without departing from the spirit and scope of the present disclosure as defined by the appended claims.

What is claimed is:

1. A voltage control circuit comprising:
   a voltage dividing unit dividing a supply voltage into a first voltage and a second voltage different from each other;
   a shunt regulator adjusting the first voltage according to the second voltage;
   an output circuit unit outputting a voltage regulated by the shunt regulator at an output terminal; and
   a voltage adjusting unit adjusting the outputted voltage from the output terminal according to a dimming voltage to provide a reference voltage,
   wherein the voltage adjusting unit includes three or more output resistors connected in series between a supply voltage terminal and a ground; and
   a Zener diode connected between a ground and one of the connection nodes between the output resistors;
   wherein the voltage adjusting unit receives the dimming voltage in a connection node between the output resistors and provides the reference voltage to another connection node between the output resistors.

2. The voltage control circuit of claim 1, wherein the voltage dividing unit includes first, second and third resistors connected in series between a terminal of the supply voltage and a ground, outputs the first voltage from a first connection node between the first resistor and the second resistor, and outputs the second voltage from a second connection node between the second resistor and the third resistor,
   wherein the second resistor is a negative temperature coefficient (NTC) thermistor having an impedance characteristic inversely proportional to temperature.

3. The voltage control circuit of claim 1, wherein the shunt regulator includes:
   a comparator connected to a second connection node to compare the second voltage with a threshold voltage and providing a comparison voltage; and
   a transistor connected between the second connection node and the ground and adjusting the second voltage according to the comparison voltage.

4. The voltage control circuit of claim 1, wherein the output circuit unit includes a resistor and a capacitor connected in series between a supply voltage terminal and a ground, wherein a connection node between the resistor and the capacitor is connected to a first connection node and an output terminal.

* * * * *